United States Patent
de Souza

(10) Patent No.: US 7,413,797 B2
(45) Date of Patent: Aug. 19, 2008

(54) BACKUP THERMAL INSULATION PLATE

(75) Inventor: Mauricio Munhoz de Souza, Vinhedo SP (BR)

(73) Assignee: Unifrax ILLC, Niagara Falls, NY (US)

( * ) Notice: Subject to any disclaimer, the term of this patent is extended or adjusted under 35 U.S.C. 154(b) by 0 days.

(21) Appl. No.: 11/809,352

(22) Filed: May 31, 2007

(65) Prior Publication Data

US 2007/0281565 A1 Dec. 6, 2007

Related U.S. Application Data

(60) Provisional application No. 60/809,620, filed on May 31, 2006.

(51) Int. Cl.
*B32B 17/12* (2006.01)

(52) U.S. Cl. .................... 428/293.4; 501/95.1

(58) Field of Classification Search .............. 428/292.1, 428/293.4, 292.4; 442/179, 172, 136; 501/95.2
See application file for complete search history.

(56) References Cited

U.S. PATENT DOCUMENTS

| | | |
|---|---|---|
| 3,568,611 A | 3/1971 | Konrad et al. |
| 3,616,173 A | 10/1971 | Green et al. |
| 4,007,539 A | 2/1977 | Nishio |
| 4,151,693 A | 5/1979 | Harvey |
| 4,307,197 A | 12/1981 | Daniel et al. |
| 4,389,282 A | 6/1983 | Yonushonis et al. |
| 4,487,631 A | 12/1984 | Britt et al. |
| 4,510,253 A | 4/1985 | Felice et al. |
| 4,545,423 A | 10/1985 | Platek et al. |
| 4,545,568 A | 10/1985 | Rothfuss et al. |
| 4,675,879 A | 6/1987 | Meredith |
| 4,698,213 A | 10/1987 | Shimozi et al. |
| 4,734,031 A | 3/1988 | Hughes |
| 4,737,326 A * | 4/1988 | Wirth et al. .................. 264/641 |
| 4,781,238 A | 11/1988 | Koisers et al. |
| 4,840,297 A | 6/1989 | Weekley et al. |
| 4,857,489 A | 8/1989 | Bearden |
| 4,973,433 A | 11/1990 | Gilbert et al. |
| 4,985,212 A | 1/1991 | Kawakami et al. |
| 5,065,987 A | 11/1991 | Hounsel |
| 5,073,199 A | 12/1991 | Krowl et al. |
| 5,145,539 A | 9/1992 | Horikawa et al. |
| 5,273,821 A | 12/1993 | Olson et al. |
| 5,366,942 A | 11/1994 | Ferguson et al. |
| 5,476,891 A | 12/1995 | Welna |
| 5,482,681 A | 1/1996 | Sager, Jr. |

(Continued)

FOREIGN PATENT DOCUMENTS

EP  0 051 910 A1  5/1982

(Continued)

*Primary Examiner*—N Edwards
(74) *Attorney, Agent, or Firm*—Curatolo Sidoti Co., LPA; Joseph G. Curatolo; Salvatore A. Sidoti

(57) ABSTRACT

A backup thermal insulation plate includes a colloidal inorganic oxide-impregnated, pressed and dried high-temperature-resistant inorganic-fiber blanket or board, the plate having a use temperature up to at least about 1000° C. and maintaining mechanical integrity after exposure to the use temperature, the plate having a density greater than or equal to about 500 kg/m$^3$, and a compression resistance of at least about 50 kgf/cm$^2$.

18 Claims, 5 Drawing Sheets

U.S. PATENT DOCUMENTS

| | | | |
|---|---|---|---|
| 5,486,338 | A | 1/1996 | Ota et al. |
| 5,488,018 | A | 1/1996 | Limaye |
| 5,556,586 | A | 9/1996 | Shchetanov et al. |
| 5,558,801 | A | 9/1996 | Tsukahara et al. |
| 5,644,919 | A | 7/1997 | Baker et al. |
| 5,645,121 | A | 7/1997 | Barnes |
| 5,672,389 | A | 9/1997 | Tran et al. |
| 5,703,147 | A | 12/1997 | Martin et al. |
| 5,709,639 | A | 1/1998 | Hart et al. |
| 5,830,548 | A | 11/1998 | Andersen et al. |
| 5,872,067 | A | 2/1999 | Meng et al. |
| 5,880,046 | A | 3/1999 | Delvaux et al. |
| 5,882,608 | A | 3/1999 | Sanocki et al. |
| 5,943,771 | A | 8/1999 | Schmitt |
| 6,000,131 | A | 12/1999 | Schmitt |
| 6,043,172 | A | 3/2000 | Hart |
| 6,043,173 | A * | 3/2000 | Hart .......................... 501/95.2 |
| 6,077,883 | A | 6/2000 | Taylor et al. |
| 6,101,714 | A | 8/2000 | Schmitt |
| 6,162,404 | A | 12/2000 | Tojo et al. |
| 6,185,820 | B1 | 2/2001 | Foster |
| 6,248,677 | B1 | 6/2001 | Dowding et al. |
| 6,287,994 | B1 | 9/2001 | Hart |
| 6,299,843 | B1 | 10/2001 | Locker et al. |
| 6,316,384 | B1 | 11/2001 | Brück et al. |
| 6,317,976 | B1 | 11/2001 | Aranda et al. |
| 6,486,445 | B1 | 11/2002 | Pendergraft |
| 6,491,878 | B1 | 12/2002 | Locker et al. |
| 6,613,294 | B2 | 9/2003 | Sanocki et al. |
| 6,613,295 | B1 | 9/2003 | Kageyama et al. |
| 6,701,637 | B2 | 3/2004 | Lindsay et al. |
| 6,733,628 | B2 | 5/2004 | Dinwoodie |
| 6,787,115 | B2 | 9/2004 | Goebel |
| 6,790,417 | B2 | 9/2004 | Boger |
| 6,848,497 | B2 | 2/2005 | Sale et al. |
| 6,899,777 | B2 | 5/2005 | Vaidyanathan et al. |
| 6,991,803 | B2 | 1/2006 | Sapieszko et al. |
| 6,998,017 | B2 | 2/2006 | Lindsay et al. |
| 7,111,392 | B2 | 9/2006 | Irie et al. |
| 7,118,698 | B2 | 10/2006 | Armantrout et al. |
| 2002/0098336 | A1 | 7/2002 | Love |
| 2004/0084172 | A1 | 5/2004 | Vincent et al. |
| 2004/0091700 | A1 | 5/2004 | Shah |
| 2005/0116192 | A1 | 6/2005 | Vincent |
| 2005/0127549 | A1 | 6/2005 | Bischoff |
| 2005/0271936 | A1 | 12/2005 | McGowan |
| 2006/0008395 | A1 | 1/2006 | Ten Eyck et al. |
| 2006/0108721 | A1 | 5/2006 | Weaver |
| 2007/0281565 | A1 * | 12/2007 | de Souza ................... 442/172 |

FOREIGN PATENT DOCUMENTS

| | | |
|---|---|---|
| EP | 0 077 444 A1 | 8/1982 |
| EP | 0 583 755 B1 | 2/1994 |
| EP | 0 695 334 B1 | 2/1996 |
| GB | 2 134 234 A | 8/1984 |
| WO | WO-91/17402 A1 | 11/1991 |
| WO | WO-98/22266 A2 | 5/1998 |
| WO | WO-98/22266 A3 | 5/1998 |
| WO | WO-00/15573 A1 | 3/2000 |
| WO | WO-00/15574 A1 | 3/2000 |

* cited by examiner

BACKUP THERMAL INSULATION PLATE

CROSS REFERENCE TO RELATED APPLICATIONS

This application claims the benefit of the filing date, under 35 U.S.C. § 119(e), of U.S. Provisional Application for Patent Ser. No. 60/809,620, filed on May 31, 2006, which is incorporated herein by reference as if fully written out below.

TECHNICAL FIELD

Provided are thermal insulation articles, such as a backup thermal insulation plate, and methods for making them. The backup thermal insulation plate may be used in one embodiment to prevent thermal propagation from or into molten metal handling equipment or other equipment.

BACKGROUND OF THE INVENTION

In the processing of molten metals, such as steel or aluminum, the metal handling apparatus such as ladles, torpedo cars, trough runners, tundishes and molds must be resistant to the molten metal, resistant to the mechanical stresses of the application, and also avoid premature heat loss from the system, so that the molten metal can be delivered to forming apparatus at the appropriate temperature.

The molten metal handling apparatus therefore comprises a material in direct contact with the molten metal, such as a hot-face, dense and hard refractory material showing excellent non-wetting characteristics to the molten metal. This material is then backed up with a layer of highly insulating refractory material, which provides the cold-face insulation for the apparatus. The higher the insulating properties and strength of the backup insulation, the thinner the backup insulation layer can be made to provide the desired performance characteristics. Thinner backup insulation permits a larger metals capacity for the molten metal handling apparatus, particularly such as a ladle or torpedo car.

SUMMARY

A thermal insulation article is provided, comprising a colloidal inorganic oxide-impregnated, pressed and dried high-temperature-resistant inorganic-fiber blanket or board, wherein the colloidal inorganic oxide is a composition of the colloidal inorganic oxide in combination with a gelling agent; the article having a use temperature up to at least about 1000° C. and maintaining mechanical integrity after exposure to the use temperature, the article having a density greater than or equal to about 500 kg/m$^3$, and a compression resistance of at least about 50 kgf/cm$^2$.

In certain embodiments the thermal insulation article has a thermal conductivity of less than or equal to about 0.45 W/mK at a temperature ranging from about 700° C. to about 800° C. The thermal insulation article may be used as a backup thermal insulation plate.

Commercial ceramic fiber blankets or boards may be used as a starting material, or a ceramic fiber board may be prepared, prior to impregnation with the colloidal inorganic oxide solution, by conventional vacuum cast methods.

DETAILED DESCRIPTION

Figure 1:
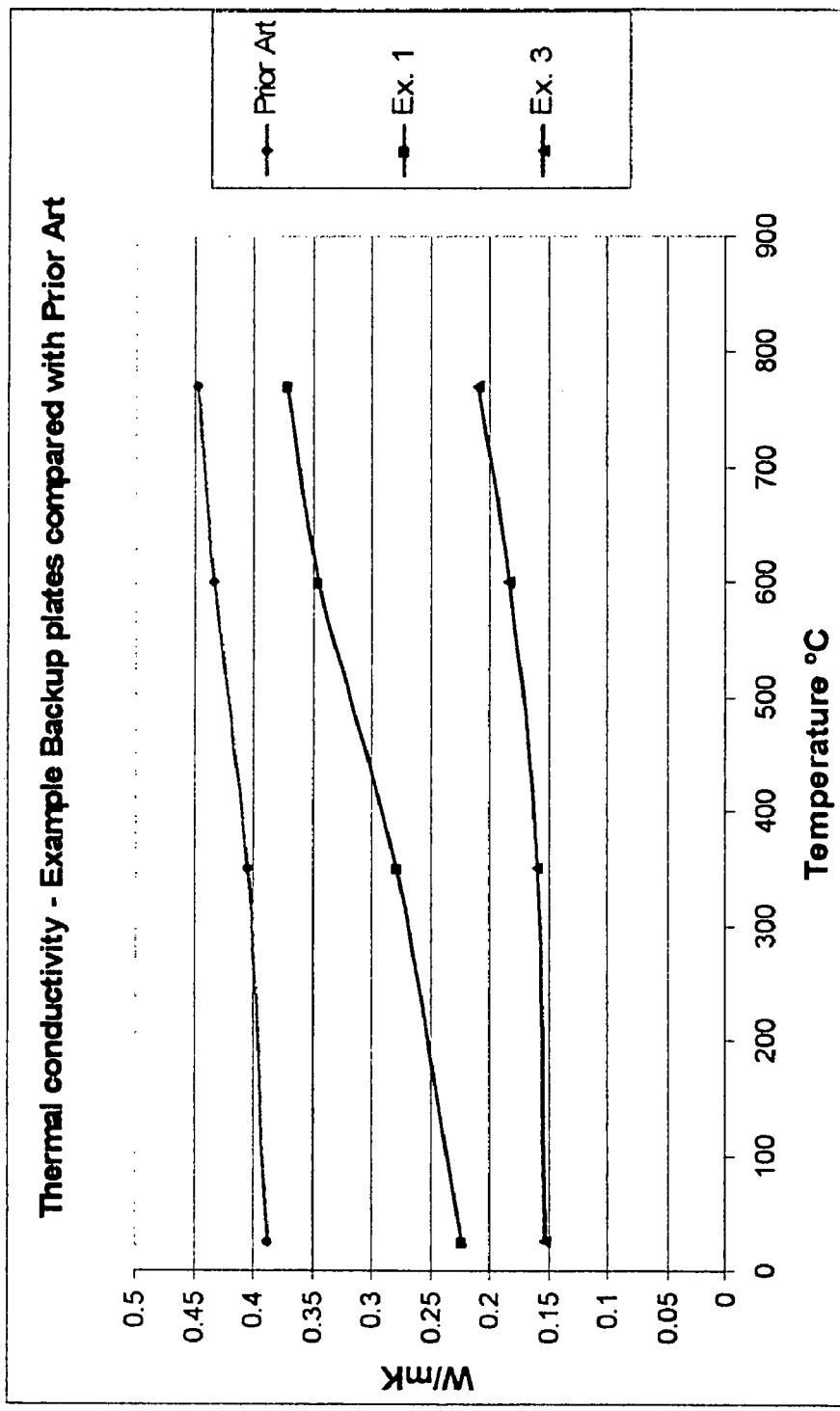
FIG. 1 is a graph showing thermal conductivity vs. temperature of the present backup insulation plates compared with a competitive product.

The present backup thermal insulation plates are able to insulate up to 1300° C., have extremely high compression resistance, have low thermal conductivity, and have very high purity, as compared to competitive product.

Generally, the process for making a backup thermal insulation plate includes impregnating an insulating ceramic fiber blanket or board with at least one colloidal inorganic oxide, such as colloidal silica, alumina and/or zirconia, placing the impregnated blanket or board in a mold and pressing the impregnated blanket or board to a desired thickness, drying in an oven to produce a dried board having the desired characteristics, and if desired, cutting the dried board to final size.

Ceramic fiber blankets or boards can be used to manufacture the backup thermal insulation plates according to the processes disclosed below.

The ceramic fiber blanket or board that is useful for making the backup insulation plate can be manufactured using known methods, or it can be acquired commercially. Suitable starting ceramic blankets and boards are currently available from Unifrax I LLC (Niagara Falls, N.Y.) under the trademarks DURABLANKET and DURABOARD.

For illustrative purposes and not for limitation, such commercially available ceramic blankets may comprise ceramic fibers, and in certain embodiments have an alumina content of about 43 to about 47% and a silica content of about 53 to about 57% by weight. In other embodiments the ceramic blankets may have an alumina content of about 29 to about 31%, a silica content of about 53 to about 55%, and a zirconia content of about 15 to about 17% by weight. The blankets may have a density on the order of about 30 to about 192 kg/m$^3$, in some embodiments about 64 to about 128 kg/m$^3$, and a temperature grade of about 1260° C. to about 1430° C.

Also for illustrative purposes and not for limitation, such commercially available ceramic boards may comprise ceramic fibers, and in certain embodiments have an alumina content of about 42 to about 50% and a silica content of about 50 to about 58% by weight. In other embodiments the ceramic blankets may have an alumina content of about 28 to about 32%, a silica content of about 52 to about 56%, and a zirconia content of about 14 to about 18% by weight. The boards may have a density on the order of about 150 to about 350 kg/m$^3$, a loss on ignition (LOI) of about 3 to about 10%, and a temperature grade of about 1260° C.

In addition to ceramic fiber blankets and boards comprising aluminosilicate (RCF) fibers and/or alumino zirconia silicate (AZS) fibers, the blankets and boards may comprise, alternatively or additionally, alkaline earth silicate (AES) fibers, such as those available from Unifrax I LLC under the mark ISOFRAX, and/or high temperature ceramic fibers such as high alumina fibers, such as those available from Unifrax I LLC under the mark FIBERMAX.

Ceramic fiber blankets and boards are commercially available in various thicknesses and densities. In certain embodiments, the ceramic fiber blanket or board is used to produce the backup thermal insulation plate that has a thickness that is approximately 2 to 4 times greater than that of the completed backup insulation plate. In one embodiment, the ceramic fiber blanket or board has a thickness that is approximately 3.3 times greater than that of the completed backup insulation plate, assuming a 10 pound basis weight blanket.

The typical thicknesses for backup thermal insulation vary according to the application for which it is used, as well as its thermal conductivity. For applications discussed herein, typical thicknesses include 10, 12, 16, and 25 mm but any other thickness could be produced, according to the needs of the application.

The starting ceramic fiber blanket or board may have any suitable width or length, determined by the intended use and the size of available processing equipment. In certain embodiments, a length of 840 mm by a 220 mm width is economically suitable. After impregnation and drying, the densified insulation article may be cut to the commercially desired size. For example, a typical size backup thermal insulation plate for the molten metal ladle application is about 416×101 mm, but any suitable size can prepared.

The colloidal inorganic oxide solution compositions that may be used to impregnate the ceramic fiber blanket or board may contain at least one colloidal inorganic oxide, such as colloidal silica, alumina, zirconia, titania, ceria, and/or yttria. (In this context, the term "solution" is intended to include slurries or dispersions containing the colloidal inorganic oxides.) Commercially available formulations of the colloidal inorganic oxide may be utilized, by way of illustration and not limitation, NALCO colloidal silica comprising 40% solids, available from Nalco Company (Naperville, Ill.). However, other grades of colloidal silica may also be used, such as 30% solids content or less, or alternatively greater than 40% solids content.

The colloidal inorganic oxide solution composition may comprise about 30 to 100% by weight colloidal inorganic oxide, such as colloidal silica. In certain embodiments, the colloidal inorganic oxide solution may comprise about 50 to about 90% colloidal inorganic oxide, such as colloidal silica, and in other embodiments, about 80 to 100% colloidal inorganic oxide, such as colloidal silica.

Other components of the colloidal inorganic oxide solution may include a gelling agent and water in an amount sufficient to solubilize the gelling agent. Gelling agent components may include inorganic salts or oxides that promote the setting or gelling of the colloidal inorganic oxide, for example in the case of colloidal silica, such as ammonium acetate, calcium chloride, magnesium chloride, magnesium oxide, and the like, and an acid, such as acetic acid, hydrochloric acid, phosphoric acid, and the like. The type and concentration of gelling agents are selected to destabilize the colloidal suspension, and to permit the gel or set of the inorganic oxide component in place during pressing of the high temperature resistant fiber blanket or board.

Gel time can be controlled, in part, by the concentration of the gelling agent, as the gelling time generally decreases with an increase in temperature. The amount of inorganic salt or oxide gelling agent may vary from about 0.01 to about 10% by weight of the solution. The amount of acid may vary from about 0.01 to about 10% by weight. Gel time can be controlled, in part, by the concentration of the gelling agent, as the gelling time decreases with an increase in temperature. The amount of water sufficient to solubilize the gelling agent may vary from 0 to about 70% of the solution.

The colloidal inorganic oxide solution may additionally comprise a colorant, in some embodiments, in an amount of about 0.01% to about 10% by weight, such as to enable the end product to be distinguished by color.

In the process of making the backup plate insulation article, the untreated insulation blanket or board may be impregnated with the colloidal silica solution to the point of saturation.

The impregnated blanket or board can be pressed at a pressure ranging from about 5 to about 100 tons. In certain embodiments, pressures ranging from about 20 to about 40 tons can be used. Pressures may be varied by one of skill in the art as required to achieve the properties desired for impregnated blankets or boards without undue experimentation. Any conventional press used to press ceramic insulation boards can be employed. It is known to use molds when pressing ceramic insulation boards. The mold shape and sizes can vary depending on the desired dimensions of the pressed insulation plate.

In one embodiment, the impregnated blanket or board is placed into a mold and pressed to its final thickness. The impregnated blankets or board can be kept in the press for a time ranging from about 1 to about 120 minutes. In another embodiment, the impregnated blanket or board is pressed for a time ranging from about 1 to about 5 minutes.

The pressed blanket or board can be dried in an oven at a temperature ranging from about 40° to about 350° C. In another embodiment, temperatures can be used ranging from about 80° to about 150° C.

In certain embodiments, the pressed blanket or board is dried at a temperature ranging from about 80° to about 150° C. for a time ranging from about 2 to about 6 minutes. In yet another embodiment, the pressed blanket or board is dried at a temperature ranging from about 40° to about 350° C., for a time period ranging from about 10 minutes to about 1 hour.

EXAMPLE 1

In an exempletive embodiment for preparing the backup thermal insulation plate, standard refractory ceramic fiber blanket or board were impregnated with colloidal silica. This was achieved by contacting the starting blanket or board with a colloidal-silica solution, so that it was completely soaked. In one embodiment, a ceramic fiber blanket was impregnated with a colloidal-silica solution made up of about 98.2% colloidal silica (Nalco, 40% solids); a gelling agent of about 0.81% ammonium acetate and about 0.18% acetic acid; and about 0.81% water, sufficient to solubilize the ammonium acetate.

After the ceramic fiber blanket or board had been impregnated with colloidal silica, the impregnated blanket or board was placed into a mold and pressed to its final thickness using a 25 ton industrial press. Conventional methods can be used to perform this operation. Gelling of the impregnating colloidal silica solution is allowed to occur.

The colloidal silica impregnated ceramic fiber blanket or board can be pressed to a board having a thickness of approximately 25% to approximately 50% that of the starting blanket or board. In one embodiment, the colloidal silica impregnated blanket or board is pressed to a board having a thickness of approximately 30% that of the starting ceramic fiber blanket or board.

Some of the colloidal silica solution can be recovered during the pressing operation, and recycled back to the impregnation bath if gelling has not yet occurred.

The pressed board was dried, and thereafter cut to the desired size for the backup insulation plate article. Conventional methods for cutting ceramic insulation boards are well known, and any of these methods can be used, including but not limited to the use of a circular saw, band saw, or the like.

The final backup thermal insulation plates, cut to a 400 mm×100 mm size and 10 to 16 mm thickness, had a density ranging from about 900 to about 1000 kg/M$^3$, and a compression resistance of about 120 kgf/cm$^2$.

Figure 2:
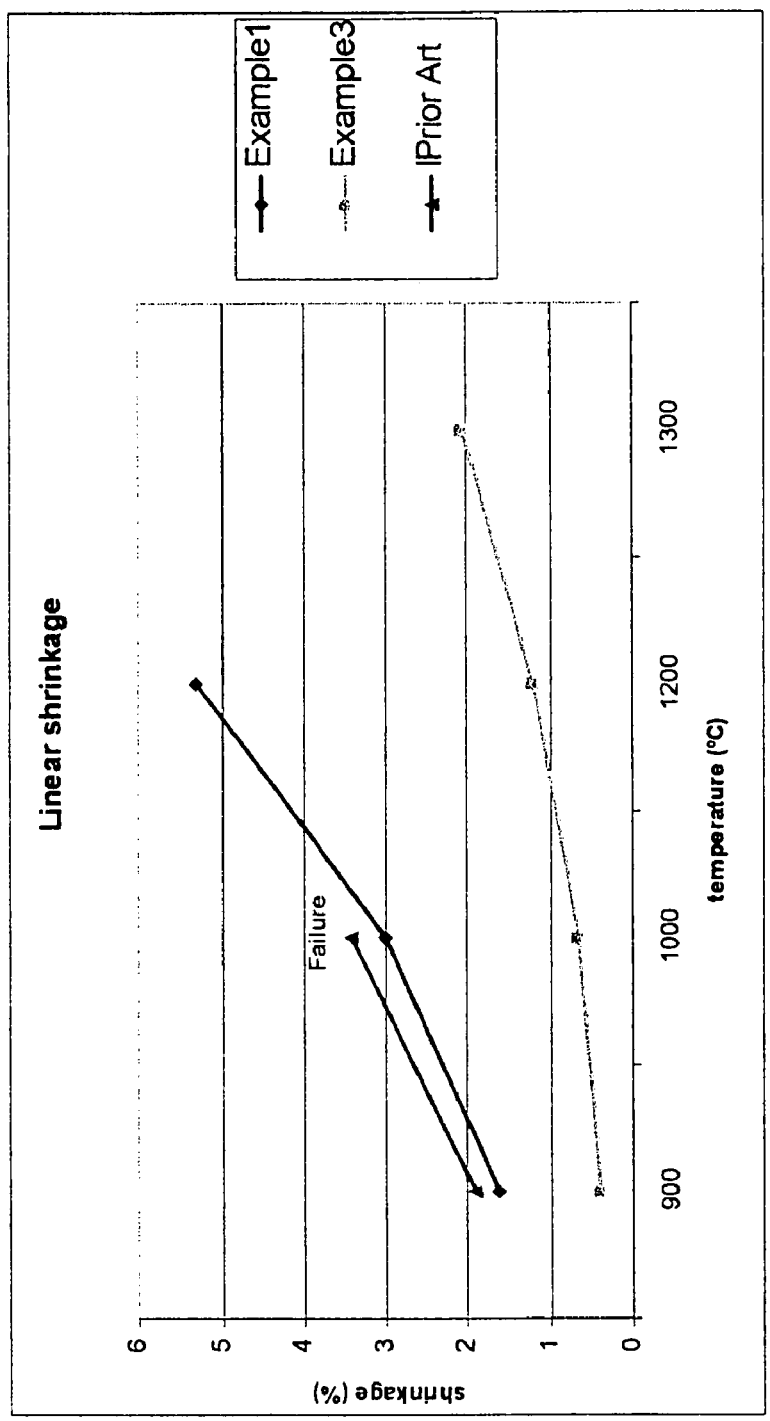
FIG. 2 is a graph showing linear shrinkage vs. temperature of the present backup insulation plates compared with a competitive product.

The thermal conductivity of the backup insulation plates, measured by the hot wire method DIN 50146, is shown in FIG. 1 and was about 0.38 W/mK at about 750° C. As shown in FIG. 2, at a temperature of about 1200° C., the thermal insulation plate had a linear shrinkage of about 5.5%. These thermal insulation plates have a use temperature up to about 1200° C.

EXAMPLE 2

In another exempletive embodiment, the ceramic fiber blanket or board had a thickness that was greater than 3.3 times that of the completed backup thermal insulation plate. Again, the standard refractory ceramic fiber blanket or board was impregnated with colloidal silica, in one embodiment, so that it was completely soaked. In one embodiment, the ceramic fiber blanket wais impregnated with a colloidal-silica solution made up of about 98.2% colloidal silica (Nalco, 40% solids); a gelling agent of about 0.81% ammonium acetate and about 0.18% acetic acid; and about 0.81% water, sufficient to solubilize the ammonium acetate.

After the ceramic fiber blanket or board had been impregnated with colloidal silica, the impregnated blanket or board was placed into a mold and pressed to its final thickness. The pressed board was dried, and thereafter cut to the desired size for the backup insulation plate article, 400 mm×100 mm size and 10 to 16 mm thickness.

Following cutting, the insulation plates were re-impregnated with a colloidal silica solution, in this embodiment comprising about a 50 weight percent portion of colloidal silica (Nalco 40% solids) in about 50 weight percent water. The re-impregnated insulation plates were thereafter dried to provide backup thermal insulation articles having a density ranging from about 1100 to about 1250 kg/m$^3$, and a compression resistance of up to about 500 kgf/cm$^2$.

As an alternative to using commercial ceramic fiber boards as a starting material, a ceramic fiber board may be prepared, prior to impregnation with the colloidal inorganic oxide solution, by conventional vacuum cast methods. For purposes of illustration but not limitation, a vacuum cast ceramic fiber board may be prepared from an aqueous solution or slurry of about 0.1 to about 2% standard RCF aluminosilicate fiber, about 0.01 to about 1.25% high alumina fiber (such as FIBERMAX fiber available from Unifrax I LLC., and an inorganic densifying agent such as about 0.1 to about 1.9% tabular alumina (all percentages by weight). Conventional amounts of starch and colloidal inorganic oxide, such as colloidal silica, typically used to make vacuum cast boards, may be present.

EXAMPLE 3

In one exempletive embodiment, a ceramic fiber board was used to make the backup thermal insulation plate, namely, a vacuum-cast ceramic fiber board wherein the board was vacuum cast from a solution having the following composition: about 97.54% water; about 0.10% FIBERMAX high alumina fiber; about 1% HP standard RCF (aluminosilicate) fiber; about 1% tabular alumina; about 0.08% starch; and about 0.28% colloidal silica.

The ceramic fiber vacuum-cast board that was used to manufacture the insulation plate had a thickness that was approximately two times (about 1.9 times) greater than that of the completed backup insulation plate.

The vacuum-cast board was impregnated with a colloidal-silica solution made up of about 80% colloidal silica (Nalco, 40% solids); about 18.53% water; about 0.1% colorant; and a gelling agent of about 1.25% ammonium acetate and about 0.25% acetic acid. In this embodiment, a lower density material was desired.

After the vacuum-cast ceramic fiber board was impregnated with colloidal silica, the impregnated board was placed into a mold and pressed to its final thickness (60 ton press). The pressed board was dried, and thereafter cut to the desired size for the backup insulation plate article, 400 mm×100 mm size and 10 to 16 mm thickness. These backup thermal insulation articles had a density ranging from about 700 to about 800 kg/m$^3$, and a compression resistance of about 80 kgf/cm$^2$.

The thermal conductivity of the backup insulation plates, measured by the hot wire method DIN 50146, is shown in FIG. 1 and was about 0.25 W/mK at about 750° C. As shown in FIG. 2, at a temperature of about 1300° C., the backup thermal insulation plate had a linear shrinkage of only about 2%. These backup thermal insulation plates have a use temperature up to about 1300° C.

In one embodiment, the impregnated articles of Example 1 and Example 3, such as a ceramic blanket and vacuum cast ceramic board, optionally prior to pressing, can be contacted together, pressed and dried, to produce a composite backup insulation article.

In certain embodiments, colloidal alumina and/or colloidal zirconia can be used together with or in place of colloidal silica.

FIG. 1 is a graph showing thermal conductivity in units of W/mK as a function of temperature in units degrees C. as measured by the hot wire method DIN 50146. The graph displays data for three separate sample sets. The first sample set comprises the present backup thermal insulation plates as prepared in accordance with the method described in Example 1. FIG. 1 shows the data from the first sample set as a line connecting a series of squares. The second sample set comprises the present backup thermal insulation plates as prepared in accordance with the method described in example 3. FIG. 1 shows the data from the second sample set as a line connecting a series of triangles. The third sample set comprises a competitive commercial product. FIG. 1 shows the data from the third sample set as a line connecting a series of diamonds.

The FIG. 1 graph demonstrates that, for all temperatures sampled, the thermal conductivity of the competitive product was higher than that of either the present backup thermal insulation plates as prepared in accordance with the method described in Example 1 or the present backup thermal insulation plates as prepared in accordance with the method described in Example 3. Therefore, the present backup thermal insulation plates are better thermal insulators than the competitive product. The graph also shows that, for all temperatures sampled, the thermal conductivity of the present backup thermal insulation plates as prepared in accordance with the method described in Example 1 was higher than that of the present backup thermal insulation plates as prepared in accordance with the method described in Example 3. That is, the present backup thermal insulation plates as prepared in accordance with the method described in Example 3 is the best insulator of the three types of backup plates tested.

FIG. 2 is a graph showing percent of linear shrinkage, a unitless measurement, as a function of temperature in units degrees C. The graph displays data for three separate sample sets. The first sample set comprises the present backup thermal insulation plates as prepared in accordance with the method described in Example 1. FIG. 2 shows the data from the first sample set as a line connecting a series of diamonds. The second sample set comprises the present backup thermal insulation plates as prepared in accordance with the method described in Example 3. FIG. 2 shows the data from the second sample set as a line connecting a series of squares. The third sample set is a competitive product. FIG. 2 shows the data from the third sample set as a line connecting a series of triangles.

Figure 3:
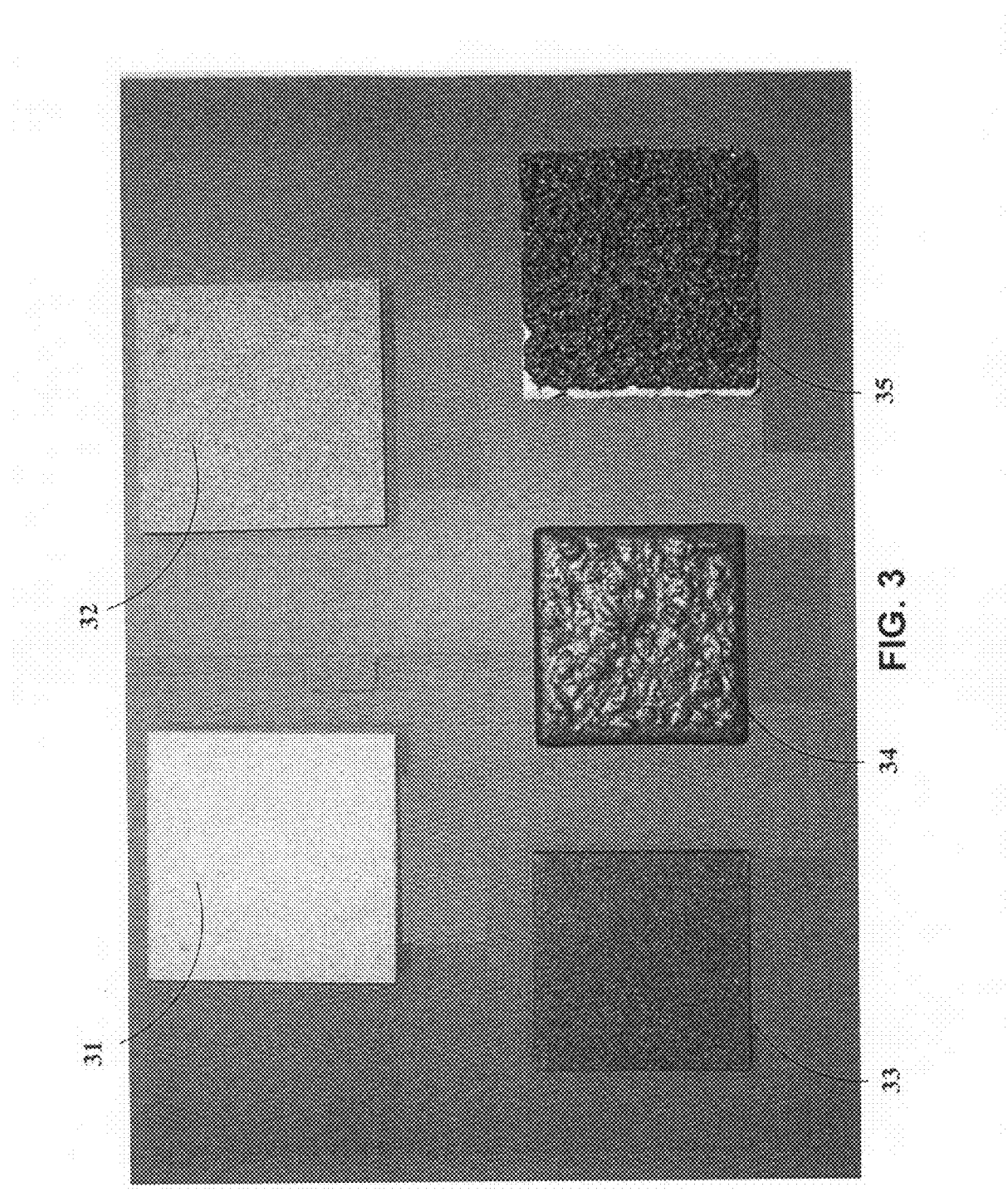
FIG. 3 is a photograph showing a set of competitive product backup plates before and after temperature exposure.
Figure 4:
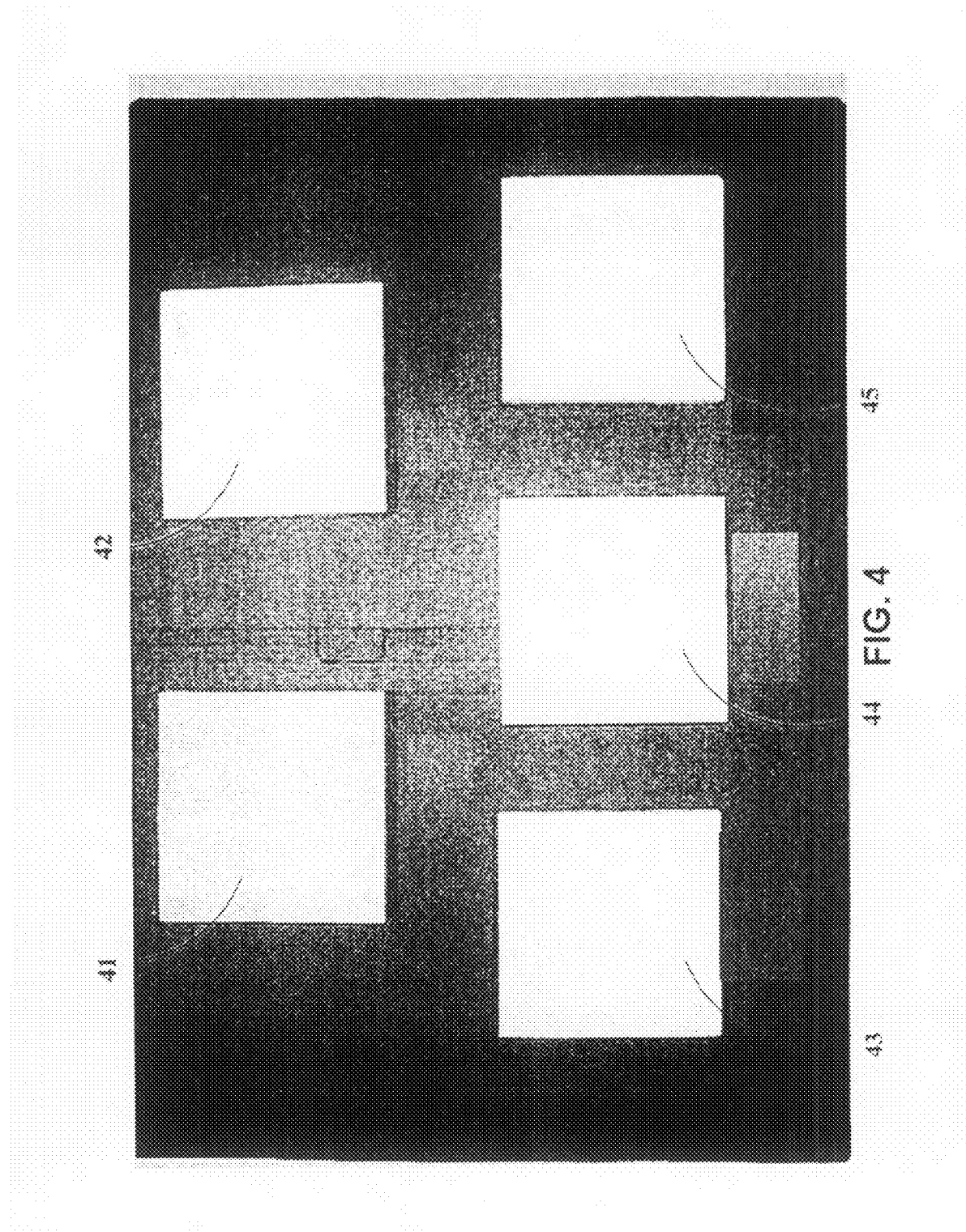
FIG. 4 is a photograph showing a set of backup plates prepared according to Example 1 (below) before and after temperature exposure.
Figure 5:
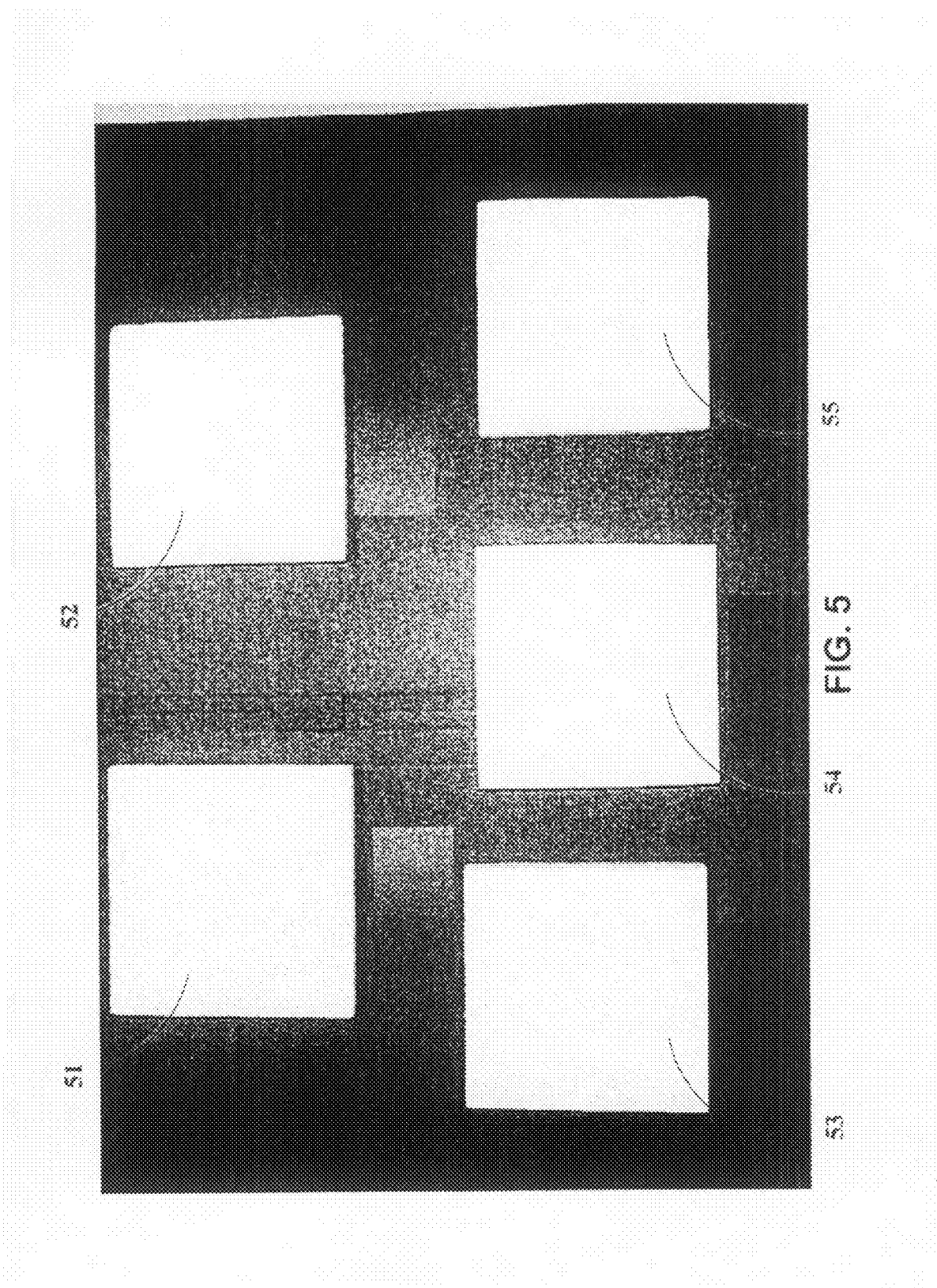
FIG. 5 is a photograph showing a set of backup plates prepared according to Example 3 (below) before and after temperature exposure.

FIG. 3 shows plates 31-35; FIG. 4 shows plates 41-45; and FIG. 5 shows plates 51-55. The plates 31-35 in FIG. 3 were all competing product plates. The plates 41-45 in FIG. 4 were all prepared according to the embodiment in Example 1. The plates 51-55 in FIG. 5 were all prepared according to the embodiment in Example 3.

In FIGS. 3-5, plates 31, 41, and 51 are control plates exposed only to ambient temperatures. Plates 32, 42, and 52 have been exposed to 1000° C. temperatures. Plates 33, 43, and 53 have been exposed to 1100° C. temperatures. Plates 34, 44, and 54 have been exposed to 1200° C. temperatures, and plates 35, 45, and 55 have been exposed to 1300° C. temperatures.

In FIG. 3, plate 31 is light yellow with a smooth, low glaze finish; plate 32 is light orange with a smooth, low glaze finish; plate 33 is reddish-brown with a low glaze finish. Plate 33 is also markedly smaller than the control plate (Plate 31); plate is brown with a bumpy, high glaze finish; plate 34 is also markedly smaller than the control plate (Plate 31); plate 35 is dark brown, with a rough surface and with a low glaze finish; plate 35 is smaller than the control plate.

In FIG. 4, plate 41 is off-white with a smooth, low glaze surface. Plates 42, 43, 44, and 45 are each similar in appearance to plate 1. None of plates 42, 43, 44, and 45 show noticeable changes in color, surface texture, surface gloss, or size after exposure to high temperatures, exhibiting high temperature and shrinkage resistance.

In FIG. 5, plate 51 is off-white with a smooth, low-gloss surface. Plates 52, 53, 54, and 55 are similar in appearance with respect to color, surface texture, and surface gloss. Plates 52, 53, and 54 are similar in size to plate 51. Plate 55 is slightly smaller than plate 51. The plates 52-55 exhibit high temperature resistance and substantial shrinkage resistance.

The composition of the present, completed backup thermal insulation plates, when produced from ceramic fiber blanket or board and impregnated with colloidal silica solution, generally may comprise from about 30 to about 80 percent by weight fiber, and from about 20 to about 70 percent by weight colloidal silica. When the impregnated and dried ceramic blanket or board is re-impregnated with colloidal silica, the completed backup thermal insulation plate may comprise from about 20 to about 60 percent by weight fiber, and from about 40 to about 80 percent by weight colloidal silica. When the starting ceramic board is vacuum cast according to the process described in Example 3, the completed backup thermal insulation plate may comprise from about 40 to about 80 percent by weight fiber, and from about 20 to about 60 percent by weight colloidal silica. The vacuum cast ceramic fiber board, prior to colloidal silica impregnation, may comprise from about 0.4 to about 50 percent by weight high alumina fiber, from about 4 to about 90 percent by weight tabular alumina, from about 0.01 to about 0.2 percent by weight starch, and optionally, colloidal silica.

The completed backup thermal insulation plates, when produced from ceramic fiber blanket or board and impregnated with colloidal silica solution, generally have a percent linear shrinkage ranging from about 2 to about 6 percent at a temperature ranging from about 900° C. to about 1100° C. When the starting ceramic board is vacuum cast according to the process described in Example 3, the completed backup thermal insulation plate may have a percent linear shrinkage ranging from about 0.1 to about 2 percent at a temperature ranging from about 900° C. to about 1100° C.

EXAMPLE 4, 5 and 6

Thermal insulation plates were prepared according to the procedures of Examples 1, 2 and 3, and their properties are reported in the table below as Examples 4, 5 and 6, respectively.

|  | Example 4 | Example 5 | Example 6 |
|---|---|---|---|
| Compression resistance (kgf/cm$^2$) | 170 | 320 | 71 |
| Linear shrinkage @ 1000° C. | 3-4% | 3-4% | 0.5-2% |
| Density (kg/m$^3$) | 900-1000 | 1000-1200 | 800-1000 |
| Thermal conductivity (W/mK at 800° C.) | 0.37 | — | 0.20 |

Backup thermal insulation plates produced by the above-described manufacturing methods can have densities ranging from about 700 to about 1250 kilograms per cubic meter (kg/m$^3$) or greater. For ladles the compression resistance of the subject thermal insulation plates is typically in the range of 80 to 120 kgf/cm$^2$.

For torpedo cars, the compression resistance of the subject thermal insulation plates is at least 200 kgf/cm$^2$.

The very low thermal conductivity of the present backup thermal insulation plates permits the use of a thinner refractory lining, such as in a molten metal ladle or torpedo car, so as to increase the useful volume of the ladle or torpedo car for its intended application. The subject backup thermal insulation plate significantly reduces the coldface temperature of the molten metal handling apparatus, as well as reducing thermal losses of the equipment.

The substantially inorganic backup thermal insulation plate may be produced from high purity staring materials, such as the inorganic fiber, inorganic fiber blankets or boards, and colloidal inorganic oxide compositions. The purity of the commercially available starting materials provides the subject backup thermal insulation plate with the advantage of being substantially iron-free, (in some embodiments much less than 1% iron), relative to competing prior art products, which contain about 5% iron oxide. The subject backup thermal insulation plate therefore is not reactive with the refractory materials it contacts at high temperature.

It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

I claim:

1. A thermal insulation article comprising a colloidal inorganic oxide-impregnated, pressed and dried high-temperature-resistant inorganic-fiber blanket or board, wherein the colloidal inorganic oxide is a composition of the colloidal inorganic oxide in combination with a gelling agent; the article having a use temperature up to at least about 1000° C. and maintaining mechanical integrity after exposure to the use temperature, the article having a density greater than or equal to about 500 kg/m$^3$, and a compression resistance of at least about 50 kgf/cm$^2$.

2. The thermal insulation article of claim 1, wherein the colloidal inorganic oxide is a composition of colloidal silica in combination with a gelling agent; the article having a density greater than or equal to about 700 kg/m$^3$, and a compression resistance of at least about 80 kgf/cm$^2$.

3. The thermal insulation article of claim 2, wherein the colloidal inorganic oxide composition comprises about 30 to 100% by weight colloidal silica, the gelling agent at about 0.01 to about 10% by weight of an inorganic salt or oxide and about 0.01 to about 10% by weight of an acid, and water in an amount sufficient to solubilize the gelling agent, optionally in an amount up to about 70% by weight of the composition.

4. The thermal insulation article of claim 3, wherein the article has a density greater than or equal to about 900 kg/m$^3$, a compression resistance of at least about 120 kgf/cm$^2$, and a thermal conductivity of less than or equal to about 0.45 W/mK at a temperature ranging from about 700 to about 800° C.

5. The thermal insulation article of claim 3, comprising about 30 to about 80 percent by weight fiber, and about 20 to about 70 percent by weight colloidal silica.

6. The thermal insulation article of claim 3, wherein the gelling agent inorganic salt or oxide comprises at least one of ammonium acetate, calcium chloride, magnesium chloride, or magnesium oxide, and the acid comprises at least one of acetic acid, hydrochloric acid, or phosphoric acid.

7. The thermal insulation article of claim 2, wherein the high-temperature-resistant inorganic-fiber blanket or board is re-impregnated with at least colloidal silica after a first impregnation with the colloidal inorganic oxide composition, pressing and optionally drying; the article having a density greater than or equal to about 1100 kg/m$^3$, and a compression resistance of at least about 300 kgf/cm$^2$.

8. The thermal insulation article of claim 7, comprising about 20 to about 60 percent by weight fiber, and about 40 to about 80 percent by weight colloidal silica.

9. The thermal insulation article of claim 1, comprising a colloidal-silica-impregnated vacuum cast ceramic-fiber board, the article having a use temperature up to about 1300° C., a density greater than or equal to about 700 kg/m$^3$, and a compression resistance of at least about 70 kgf/cm$^2$.

10. The thermal insulation article of claim 9, wherein the vacuum cast ceramic fiber board, prior to colloidal silica impregnation, comprises about 0.4 to about 50 percent by weight high alumina fiber, about 4 to about 90 percent by weight tabular alumina, and about 0.01 to about 0.2 percent by weight starch.

11. The thermal insulation article of claim 9, comprising about 40 to about 80 percent by weight fiber, and about 20 to about 60 percent by weight colloidal silica.

12. The thermal insulation article of claim 9, wherein the vacuum cast ceramic fiber board is cast from an aqueous slurry comprising about 0.1 to about 2% by weight aluminosilicate fiber, about 0.01 to about 1.25% by weight high alumina fiber and about 0.1 to about 1.9% by weight of an inorganic densifying agent, said densifying agent optionally being tabular alumina, and said slurry further optionally comprising starch and colloidal silica.

13. The thermal insulation article of claim 9, having a thermal conductivity of less than or equal to about 0.2 W/mK at a temperature ranging from about 700 to about 800° C.

14. The thermal insulation article of claim 2, wherein the high-temperature-resistant inorganic-fiber comprises at least one of refractory ceramic fiber (RCF), aluminosilicate fiber, high alumina fiber, alkaline earth silicate fiber, alumino silica zirconia fiber, or mixtures thereof.

15. The thermal insulation article of claim 1, wherein the compression resistance is substantially uniform throughout the article.

16. The thermal insulation article of claim 1 wherein the colloidal inorganic oxide comprises at least one of colloidal silica, colloidal alumina, colloidal zirconia, colloidal titania, colloidal ceria, or colloidal yttria.

17. The thermal insulation article of claim 2, wherein the thermal insulation article comprises a colloidal silica-impregnated high temperature resistant inorganic fiber blanket that optionally prior to pressing, is contacted together with a colloidal silica-impregnated vacuum cast ceramic fiber board, pressed and dried, to produce a composite thermal insulation article.

18. The thermal insulation article of claim 1, wherein the thermal insulation article comprises backup thermal insulation for at least one of a ladle, torpedo car, trough runner, or tundish.

* * * * *